June 2, 1970

E. D. SPRAKER 3,516,062

UNIQUELY CODED IDENTIFICATION AND ENABLING
OF A DATA TERMINAL

Filed Dec. 18, 1968

INVENTOR:

EARL D. SPRAKER

Richards Harris
& Hubbard

ATTORNEY

3,516,062
Patented June 2, 1970

3,516,062
UNIQUELY CODED IDENTIFICATION AND ENABLING OF A DATA TERMINAL
Earl D. Spraker, Dallas, Tex., assignor to Electronic Data Systems Corporation, Dallas, Tex., a corporation of Texas
Filed Dec. 18, 1968, Ser. No. 784,580
Int. Cl. H04q 9/00
U.S. Cl. 340—152     12 Claims

ABSTRACT OF THE DISCLOSURE

Control is provided for transmission of data signals over a communication channel from a data terminal. Identification means connected to the channel is responsive to a call signal thereon for transmitting to the channel a signal uniquely identifying the terminal. A transmission enable means connects the terminal to the channel and means responsive to transmission of the identifying signal arms the enable means for response to an enable signal on the channel whereby the terminal may then be enabled to transmit signals to the channel.

---

This invention relates to identification and enabling of data transmission from a data terminal to a communication channel and more particularly to the automatic transmission of a terminal identification code and, in response thereto, arming an enable means as to be responsive to an enable signal only after transmission of an identification code.

In the operation of data input terminals to communication systems for automated data handling centers, coordination between the operation of the data source and the center is necessary. In applicant's copending application Ser. No. 773,680, filed Sept. 16, 1968, now Patent No. 3,515,806, there is disclosed a data input terminal wherein provision is made for the automatic transmission of a call code whereby a center may be linked to the data terminal. Following this an identification code is transmitted to the center so that the source of the subsequently transmitted data will have been identified to the center. The present invention deals with the problem of exercising control from such a center, for example, over the data transmission capabilities of a data input terminal which may be remote from the center.

The invention will be described in connection with a particular embodiment wherein transmission of data signals over telephone lines via tone signals is accomplished. The tone signals may be those such as are produced by actuating tone generators through arrays of push buttons. In such systems automatic preprogrammed programmable call sequences of voice tone signals and identification of the caller by such sequence are desirable.

In accordance with the present invention, data transmission from data terminal is provided together with identification means which is connected to the data channel and which is responsive to a call signal on the channel for transmitting to the channel a signal uniquely identifying the terminal. A transmission enable means is connected between the terminal and the channel and is provided with means responsive to transmission of the identifying signal which arms the enable means for response to an enable signal on the channel whereby, only after receipt of an enable signal by the enable means, would the terminal be cleared to transmit a data signal to the channel.

In a preferred embodiment of the invention the enable means includes a switch that is latched normally to prevent transmission of data to the terminal and a suitable trigger means to unlatch the switch means in response to the enable signal.

These and other features of the invention will become more apparent to those skilled in the art by reference to the following detailed description taken in conjunction with the accompanying drawings, in which:

Figure 1:
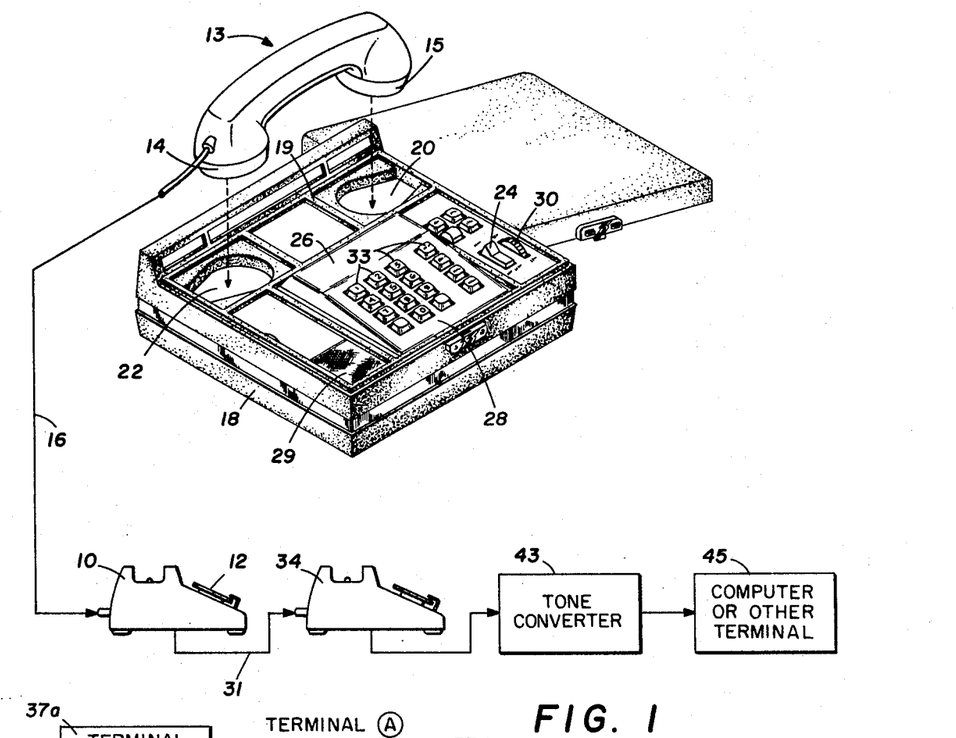
FIG. 1 is a diagrammatic perspective view of a system embodying the invention.

Referring now to the drawings wherein like numerals indicate like parts, conventional telephone 10 is shown with the rotary dialing mechanism 12. The mouthpiece 14 and earpiece 15 are formed in the handset 13. A cord 16 connects the handset to the housing as disclosed in Pat. No. 3,515,806 (Ser. No. 773,680, filed Sept. 16, 1968).

A portable casing or housing 18 has an upper surface 19 in which two receptacles 20 and 22 are formed. The receptacle 20 is adapted to receive the earphone 15 and the receptacle 22 is adapted to receive the mouthpiece 14. A switch 24 provides for energizing the unit.

The casing 18 has a front console surface 26 in which a keyboard panel 28 is mounted along with a speaker 29, and a volume control 30. The panel 28 includes an array of selector buttons 33.

A telephone line 31 connects the instrument 10 to a receiver 34. The receiver 34 is connected to a tone converter 43. A control device 37, FIG. 2, may be programmed to control a generator 44 to generate and transmit a sequency of identification tone signals. Data from the tone converter 43 is fed to a data center which may include a computer 45. Other data center devices of known types may also be used. The present invention relates to the control of such a terminal or other data input device. There is provided, by the present invention, means for preventing transmission of data from the terminal until called for and the terminal is identified.

Figure 2:
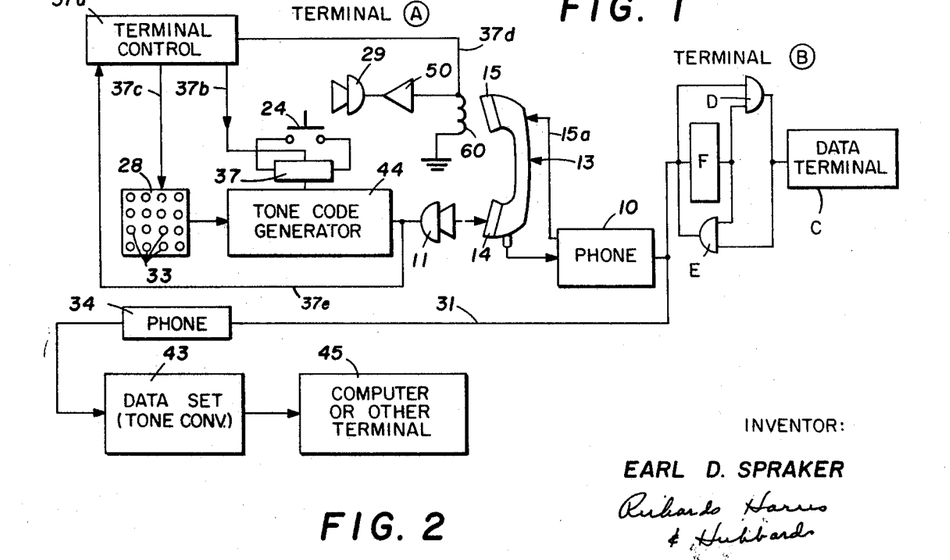
FIG. 2 is a more complete diagrammatic view showing several parts contained within the tone generator housing.

The control system is shown diagrammatically in FIG. 2. In FIG. 2, two data terminals, terminal A and terminal B are shown, the latter being shown in block form. In terminal A, the keyboard 28 is connected to a tone generator 44, which will be described more fully hereinafter. Recognizable, distinguishable tone combinations preferably are generated by depressing each of the buttons 33. The tones generated are fed to a speaker 11 whose output is sensed by the mouthpiece 14 for transmission by phone 10, channel 31 and phone 34 to data converter 43 and computer 45.

In accordance with the present invention, a terminal control unit 37a is connected to the control 37 for tone generator 44 by channel 37b and to the keyboard 28 by channel 37c. In accordance with the present invention, when handset 13 is placed on unit 18 and the on-off switch 24 is actuated to energize the terminal A, the system is latched to prevent data transmission by a control condition on line 37c. It stays in a latched condition until a call signal is received by the system by way of channel 15a and earpiece 15. The call signal may comprise a series of combinations of tone signals properly coded. Such tone signals are applied by way of input channel 37d to the terminal control unit 37a. When the call signal is decoded, a signal is applied by way of channel 37b to the control unit 37 for the tone code generator 44. In response, generator 44 transmits a terminal identification series of tone combinations over line 31.

Transmission of an identification signal from unit 44 arms the terminal control unit 37a by way of channel 37e as to make it responsive to an enable signal thereafter received by terminal control 37a from the computer 45. After the computer 45 receives the identification signal it transmits an enable signal over channel 31 which then causes unit 37a to apply a gating signal by way of channel 37c to the keyboard unit 28 to permit the keyboard unit 28 to be operative to produce data at terminal A for use by computer 45.

The user may then depress one or more of the buttons (0–9) on panel 28 and then button EOB or button EOT to command a given action. The tone generators produce a tone combination code which is reproduced in speaker 11. Since the speaker 11 is directly below the mouthpiece 14, tones are delivered to the set 10 which are transmitted to the remote receiver set 34. The receiver telephone is connected to a tone re-converter apparatus which can be of a type currently marketed by Western Electric under a Model 403A. With such a converter, the frequency (tone) data is changed into DC impulses readable by the computer. In practice, an IBM 7770 voice answer back-audio response unit has been found to be suitable for these purposes.

The apparatus shown in FIGS. 1 and 2 can also serve as an output terminal by sensing voice frequency signals which energize the earpiece 15. As indicated by the dotted lines 15a, FIG. 2, the incoming audio frequency signals are detected by an induction coil 60. The signals are amplified in amplifier 50 and reproduced through the speaker 29 of the housing 18. As is known, apparatus such as the above-mentioned IBM 7770 simulates the voice, thereby enabling the computer audibly to talk through the terminal A in addition to communication by way of the call signal and enable signal on line 37d. Such communication is conveniently amplified to a level suitable for recording or for listening by ear.

Similarly terminal B and other terminals may access computer 45 by way of line 31. However such terminal will be controlled by the computer as to enable data production.

In FIG. 2, terminal B includes a data terminal unit c connected by input gate D and output gate E to line 31. A control unit F is connected at its input to line 31 and at its output to each of gates D and E.

In operation, a call signal from computer 45 causes unit F to transmit a terminal B identification signal to line 31. Transmission of such identification signal arms gates D and E so that an enable signal from computer 45 will thereafter permit transmission of data from data terminal c to line 31.

Figure 3:
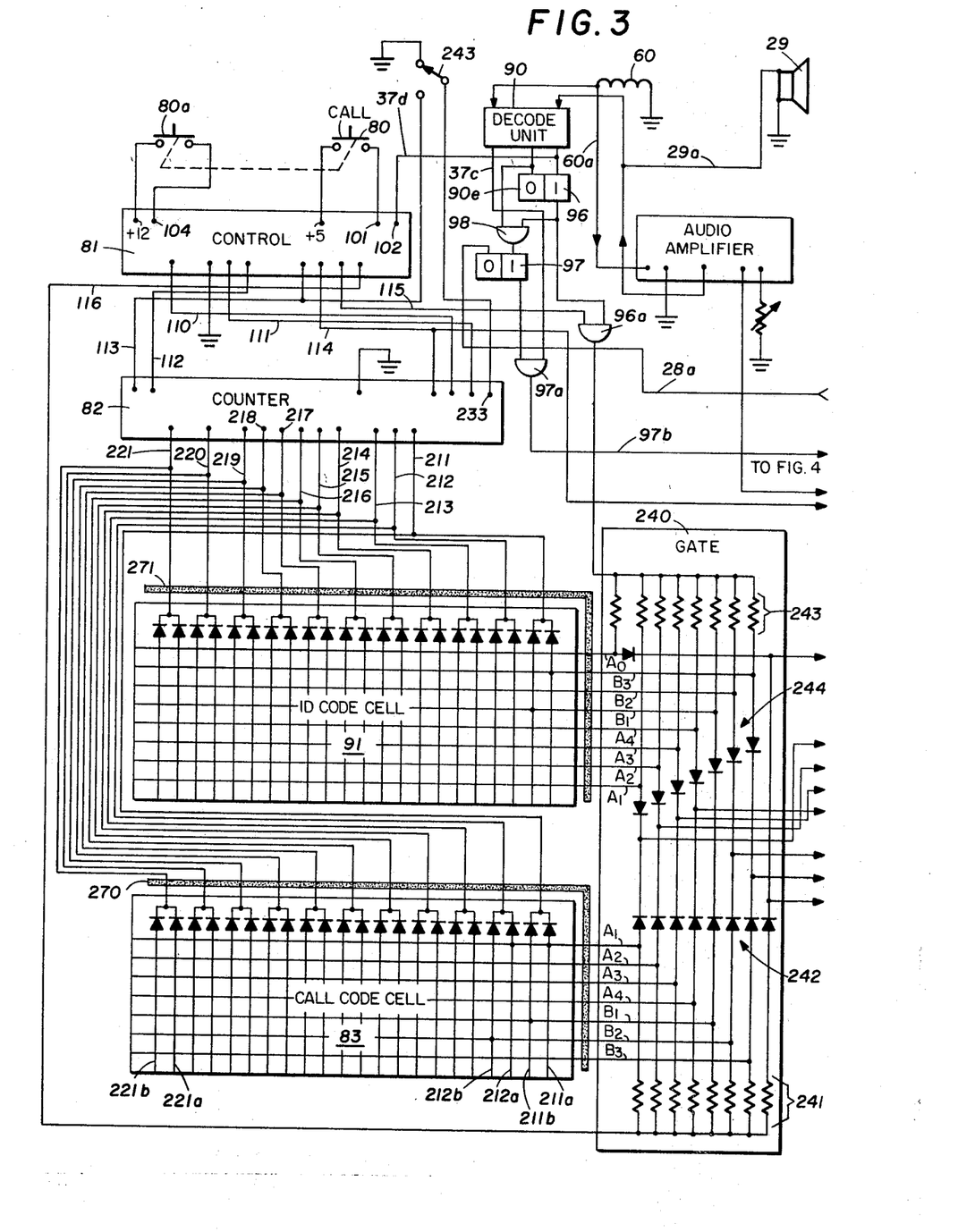
FIGS. 3 and 4 comprise a system layout in schematic block form.
Figure 4:
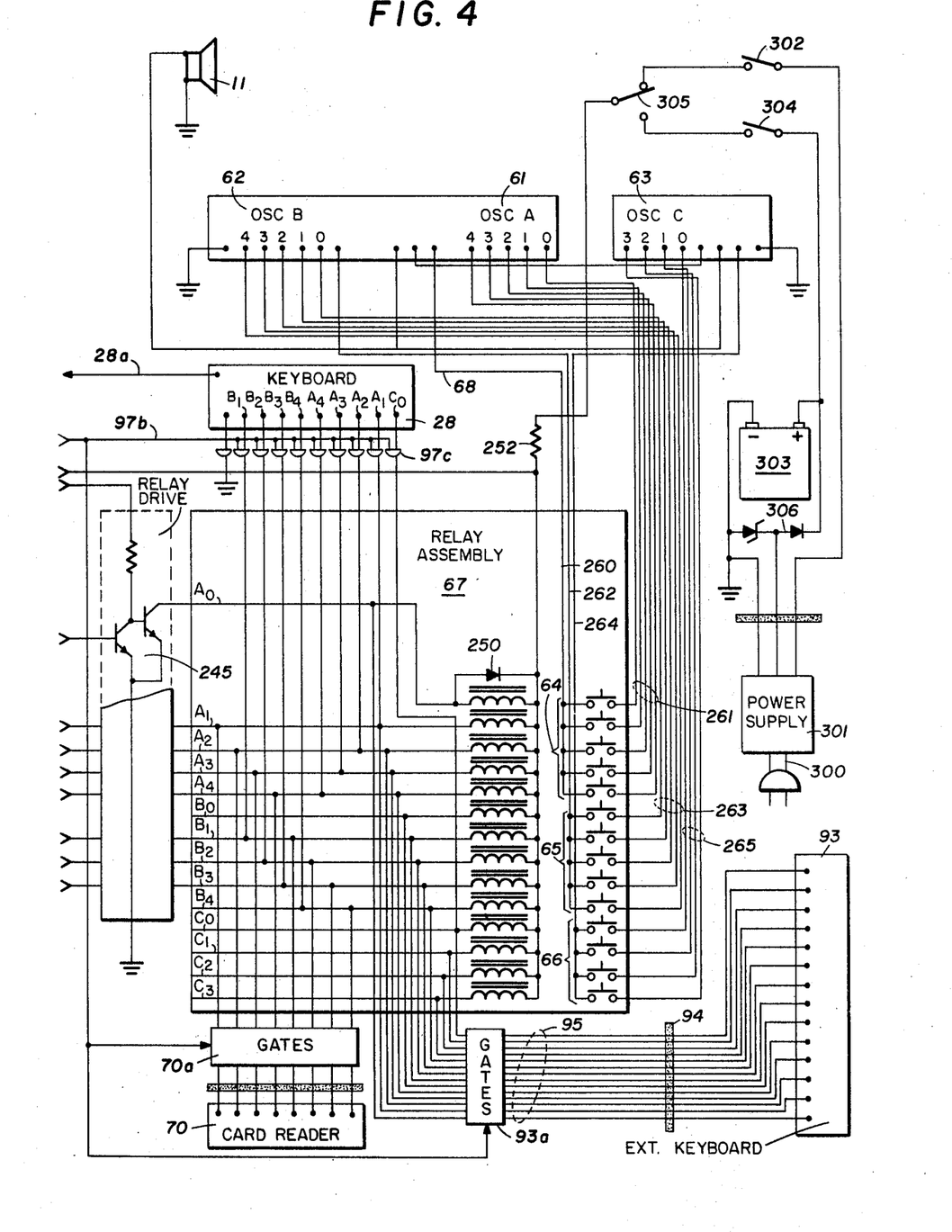

FIGS. 3 AND 4

One embodiment of terminal A has been shown in FIGS. 3 and 4. This system provides for generating preprogrammable sequences of voice frequency tone combinations that can be transmitted by way of speaker 11 to the telephone handset. It further provides coded cells that may be of the plug-in type whereby any terminal can be provided with call cells which in response to an actuator or to a call signal will produce the necessary sequence of coded tone combinations to identify terminal A and provide a necessary interlock or enabling condition to be established for accessing an account with which said terminal is associated. There is also provided for automatic dialing computer 45 by a subscriber at terminal A followed by identification of terminal A at the request of computer 45.

The system shown in FIGS. 3 and 4 includes three multioutput oscillators 61, 62 and 63. In this embodiment each of oscillators 61 and 62 may provide five distinct output tones. Oscillator 63 in this embodiment may provide four output tones. The frequency of the tones may be as set out below; although this selection is not necessarily limiting.

As is understood, common carriers divide the normal voice grade signals into three sub-channels, each approximately 400 cycles wide. A code may then require a tone in each of the channels. For example, the tone frequencies on A, B and C channels may be as follows:

TABLE I

| A Channel | B Channel | C Channel |
| --- | --- | --- |
| A0—600 cycles. | B0—1,098 cycles. | C0—1,950 cycles. |
| A1—697 cycles. | B1—1,209 cycles. | C1—2,050 cycles. |
| A2—770 cycles. | B2—1,336 cycles. | C2—2,150 cycles. |
| A3—852 cycles. | B3—1,477 cycles. | C3—2,250 cycles. |
| A4—941 cycles. | B4—1,633 cycles. | |

In the "two out of eight" code only the A and B channels are utilized and the zero (0) frequencies are not used. Therefore, the matrix can be visualized as:

TABLE II

| | | B Channel | | | |
| --- | --- | --- | --- | --- | --- |
| | | B1 | B2 | B3 | B4 |
| A Channel | A1 | 1 | 2 | 3 | A |
| | A2 | 4 | 5 | 6 | B |
| | A3 | 7 | 8 | 9 | C |
| | A4 | EOB | 0 | EOT | D |

Thus, in the "two of eight" code, in order to transmit the numeral one (1), a 697 frequency or tone is sent over the A channel and a 1209 frequency or tone is sent over the B channel. To transmit a numeral nine (9), an 852 frequency or tone is generated on the A channel and a 1477 frequency or tone is placed on the B channel. By utilizing all combinations in which there must be one tone and one tone only on both the A and B channels, one can obtain the sixteen codes. Since there are a total of two tones (one on the A channel and one on the B channel) for each code out of a possibility of eight tones (four tones on the A channel and four tones on the B channel), this system of coding is known as the "two out of eight" code.

By fully utilizing a "three out of fourteen" code, at least ninety-nine valid characters and, therefore, ninety-nine tone combinations can be generated.

When all five tones on each of the A and B channels plus the four tones on the C channel are utilized, with the requirement that there be one tone on each channel, the coding technique is called a "three out of fourteen" code. Under this system, assume that to transmit the numeric digits shown in Table II there will be a C0 (1950 cycles) present on the C channel. When there is a C1 (2050 cycles) tone on the C channel, the code matrix is:

TABLE III

| | | B Channel | | | |
| --- | --- | --- | --- | --- | --- |
| | | B1 | B2 | B3 | B4 |
| A Channel | A1 | / | S | T | * |
| | A2 | U | V | W | * |
| | A3 | X | Y | Z | * |
| | A4 | * | * | * | * |

Thus, A1, B1, C1 transmission would be interpreted as a slash (/). To transmit the letter Y, tones A3, B2 and C1 would be generated on their respective channels.

The matrices for C2 and C3, respectively, would appear as:

TABLE IV
[(C2) 2,150 C.P.S.]

| | | B Channel | | | |
| --- | --- | --- | --- | --- | --- |
| | | B1 | B2 | B3 | B4 |
| A Channel | A1 | J | K | L | * |
| | A2 | M | N | O | * |
| | A3 | P | Q | R | * |
| | A4 | * | * | * | * |

TABLE V
[(C3) 2,250 c.p.s.]

| | B Channel | | | |
|---|---|---|---|---|
| | B1 | B2 | B3 | B4 |
| A Channel | A | B | C | * |
| | D | E | F | * |
| | G | H | I | * |

By combining all of such matrices along with the additional codes made available by using the combinations of A0 and B0, it will be seen that ninety-nine possible combinations are available when one and only one tone is generated on each of the three sub-channels. (A0, B0, C0 combination is not used.)

The above coding discussion applies to the ABC Code used with touch tone equipment by major common carriers and computer and terminal equipment manufacturers.

Automatic tone generation will now be described.

Three banks of reed switches 64, 65 and 66 are connected to control the oscillators 61, 62 and 63, respectively. The reed switches are each independently actuated by coils in a bank 67.

In one embodiment of the system, operations are such that only a two-tone code is used. In such case, the coils in bank 67 are selectively energized in a sequence of pairs so that a selected and pre-programmed sequence of pairs of tones will be applied by way of the output channel 68 leading to the output speaker 11. The control for generating the tone sequences may involve any one of four different inputs. The first input is the keyboard 28 which is a 4 x 4 array of touch tone actuators as shown in FIG. 2.

The second input is a card reader unit 70 which, by way of output channels 71, may be enabled selectively to energize pairs of the coils in bank 67 in any sequence or combination dictated by data encoded on a card employed with the card reader 70.

The third input is a call switch 80 which when actuated initiates operation of a control unit 81, a counter 82, and a call code cell 83 automatically to energize successive pairs of coils in bank 67 in a predetermined sequence depending upon the configuration given to the circuits in the call code cell 83.

The fourth input is an identification request decode unit 90 which when actuated initiates operation of control unit 81, counter 82 and an ID code cell 91 to energize successive pairs of the coils in bank 67 in a predetermined call sequence which depends upon the configuration of the circuits in the ID code cell 91.

An additional input is an external keyboard 93 which may be enabled to actuate the tone generators 61-63 for three tone coding. Keyboard 93 is coupled to the coil bank 67 by way of plug unit 94 and channels 95.

Figure 5:
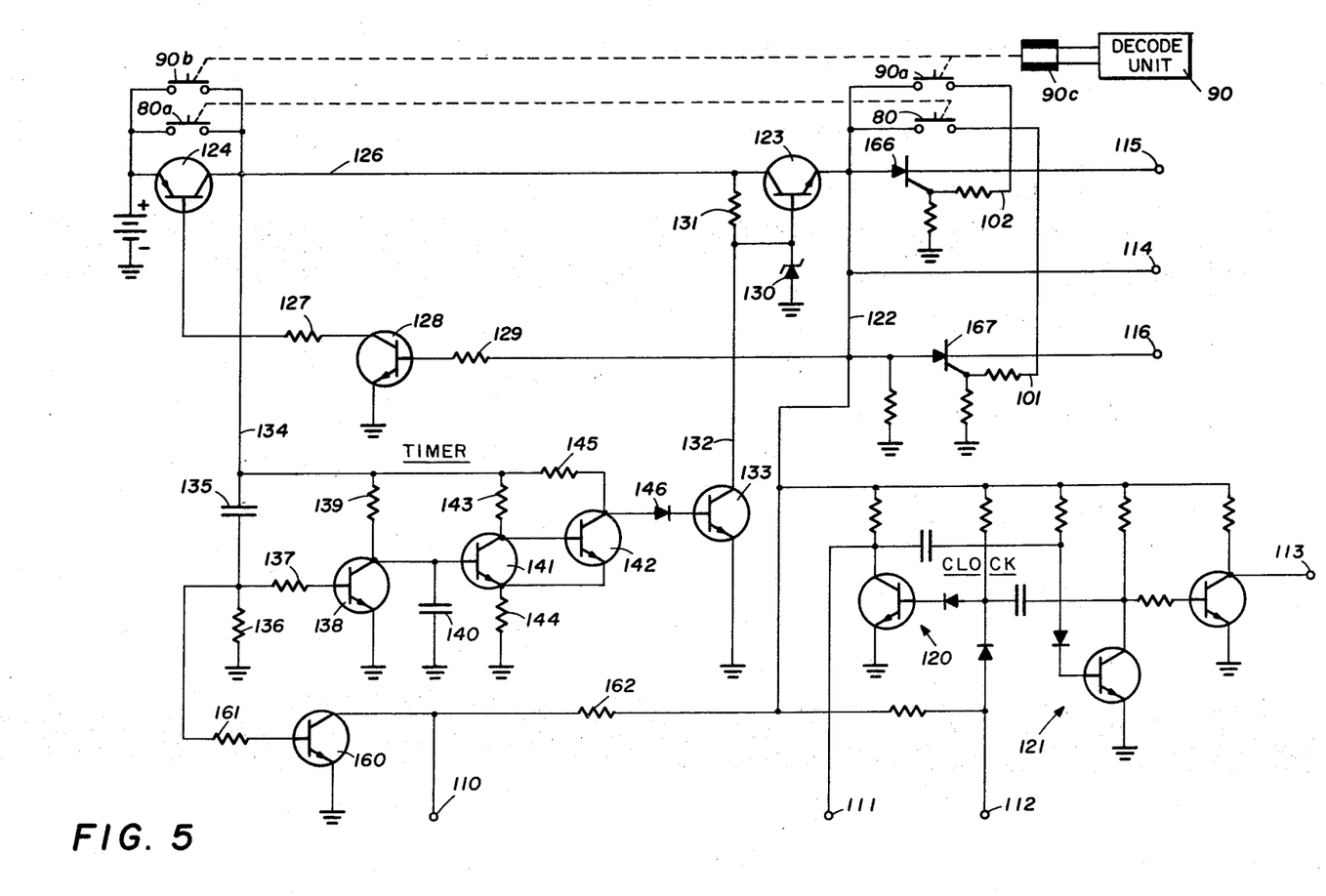
FIG. 5 is a detailed diagram of the control unit of FIG. 3.

FIGURE 5

A suitable control unit 81 is illustrated in detail in FIG. 5. Control unit 81 may be actuated by either switch 80 or decode unit 90. The switch 80 is connected between the +5 volt terminal and a call terminal 101. A switch 90a is similarly connected, but extends to an ID terminal 102. Switch 90a and switch 90b are actuated by a relay 90c at the output of decode unit 90. The switch 90a is mechanically linked to switch 90b. Switch 90b serves to connect a 12 volt supply to terminal 104 to energize control unit 81. Switch 80a is mechanically linked to switch 80 and similarly applies 12 volts to terminal 104.

Unit 81 is provided with connections including a set line 110, a clock line 111, a stop count line 112, an expander clock line 113, a 5 volt supply line 114, and ID gate line 115 and a call gate line 116.

The control unit of FIG. 5 includes an internal clock. The clock comprises a multivibrator in which two transistors 120 and 121 are connected in a conventional circuit arrangement. The supply voltage source 119 is connected to the emitter of a PNP transistor 124. Transistor 124 is in series with an NPN transistor 123 whose emitter is the B+ supply terminal for the clock.

The system is operated such that upon closure of the switch 80 or actuation of unit 90, a sequence of operations will be initiated wherein +5 volts is applied to the bus 122 for a period corresponding to 13 or 14 cycles of the clock.

More particularly, either closure of switch 80 or actuation of unit 90 exerts a control action on the transistor 124 turning transistor 124 on by reason of the +12 volts on its emitter. The collector of transistor 124 is connected to the collector of transistor 123 by way of line 126. The base of transistor 124 is connected by way of resistor 127 to the collector of transistor 128 whose emitter is connected to ground and whose base is connected by way of resistor 129 to the emitter of transistor 123. The base of transistor 123 is connected by way of a Zener diode 130 to ground. The collector of transistor 123 is connected, by way of resistor 131, to the base and by way of conductor 132 to the collector of a transistor 133. The emitter of transistor 133 is connected to ground.

The emitter of transistor 124 is connected by way of line 134, condenser 135 and resistor 136 to ground. The junction between condenser 135 and resistor 136 is connected by way of resistor 137 to the base of a transistor 138 whose emitter is connected to ground and whose collector is connected by way of resistor 139 to line 134.

The collector of transistor 138 is connected to the base of transistor 141 and, by way of condenser 140, to ground. The collector of transistor 141 is connected to the base of a transistor 142 and by way of resistance 143 to line 134. The emitters of transistors 141 and 142 are coupled together and are connected by way of resistor 144 to ground. The collector of transistor 142 is connected by way of resistor 145 to line 134 and, by way of resistor 146, to the base of transistor 133.

Operation of the portion of the circuit of FIG. 5 thus far described is as follows. When the transistor 124 is turned on, it initiates action in the timer portion so that the clock will begin operation and will continue operation for thirteen or fourteen count cycles. The momentary closure of switch 80 or actuation of unit 90 causes the base of transistor 128 to be driven to saturation thereby maintaining the transistor 124 conductive and locking the loop comprising transistors 124, 123 and 128 on, so that a positive voltage will be maintained at the emitter of transistor 123. The Zener diode 130 maintains the base of transistor 123 at 6.2 volts with the source 119 of 12 volts. This means that the voltage at the emitter of transistor 123 will be about 5.5 volts. The latter voltage on bus 122 is effective to maintain the transistor 128 in a high current state so that upon opening of the switch 80 or deactivation of unit 90, the system will be maintained locked on. It will stay locked on until the transistor 133 is turned on, shorting the Zener diode 130 to ground. The latter action will remove the voltage from the emitter of transistor 123, thereby turning transistor 128 off and terminating the cycle.

The timer is so arranged that upon conduction in transistor 124, capacitor 135 applies a voltage to the base of transistor 138 which immediately discharges capacitor 140 through the collector-emitter path. Capacitor 140 then begins to regain charge by way of resistor 139. Resistor 139 and capacitor 140 thus control the time cycle. The voltage across capacitor 140 is applied by way of a level detector 141, 142 to the base of transistor 143. The level detector 141, 142 is a modified Schmitt trigger circuit which operates such that, after a given predetermined time interval, the transistor 133 will short circuit the Zener diode 130.

The operation of the transistor 138 is such that it is immediately saturated upon conduction in transistor 124 so that condenser 140 will discharge. This makes certain that the timing circuit will start off at exactly the same point each time conduction is initiated in transistor 124.

The capacitor 135 charges to turn off the transistor 138. Thus, capacitor 135 and resistor 136 form a timing network which controls the conduction cycle of transistor 138 permitting conduction in transistor 138 for a very short interval.

Transistor 160 is connected at its base through resistor 161 to the junction between capacitor 135 and resistor 136. The emitter transistor 160 is connected to ground. The collector is connected by way of resistor 162 to bus 122. Conduction in transistor 160 serves to ground the B+ on the clock bus 122 at the beginning of each sequence. The terminal 110 is also shown in FIG. 3, and serves to apply a ground state to the connector to reset the flip-flop therein to the same state as the beginning of each count sequence.

The emitter of transistor 123 is connected to SCR units 166 and 167 and to the output terminal 114. The outputs of the SCR unit 166 is connected to terminal 115. The output of SCR unit 167 is connected to terminal 160.

Switches 80 and 90a are connected in the trigger circuits of the SCR units 167 and 166, respectively. The closure of switches 80 and 90 results in applying and maintaining a positive potential on terminals 116 and 115, respectively, for operation of the ID gate 91 and the call gate 83.

Figure 6:
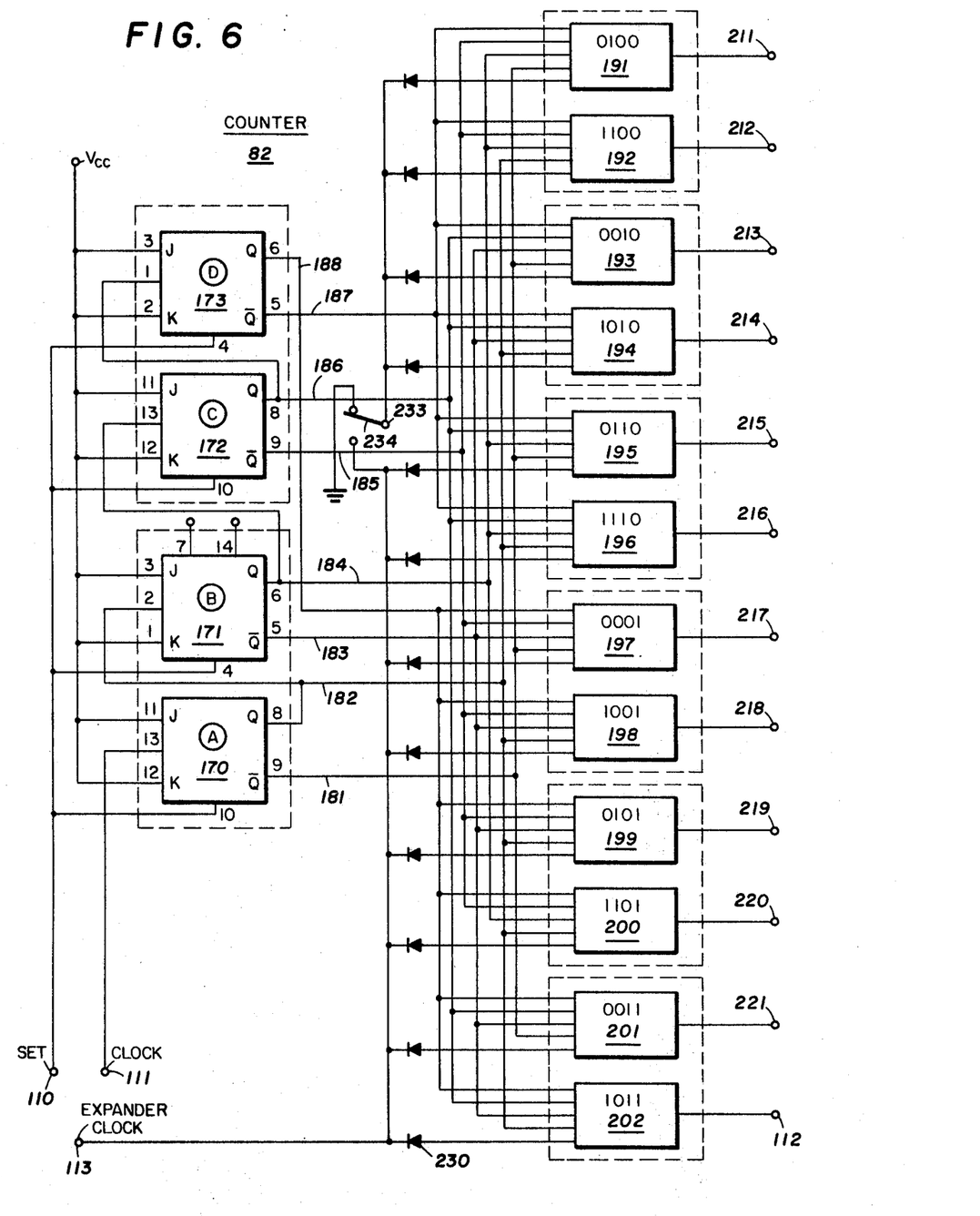
FIG. 6 is a detailed diagram of the counter unit of FIG. 3.

FIGURE 6

The counter 82 is shown in detail in FIG. 6. It comprises four flip-flops 170–173, connected in tandem with the clock terminal 111 being connected to the input of the first flip-flop 170. The set terminnal 110 is connected to the reset terminal of all four of the flip-flops 170–173.

The eight outputs from the flip-flops are connected by way of lines 181–188 to the inputs to twelve gates 191–202 having output lines 211–221 for an eleven count output. The twelfth count line 112 extends from the last gate 202. The lines 181–188 are connected to the gates 191–202, the latter being of the type which involve four gate inputs. The table for the interconnections is as follows:

TABLE VI

|     | 170 | 171 | 172 | 173 |
|-----|-----|-----|-----|-----|
| SET | 1 | 1 | 1 | 1 |
| 1   | 0 | 1 | 0 | 0 |
| 2   | 1 | 1 | 0 | 0 |
| 3   | 0 | 0 | 1 | 0 |
| 4   | 1 | 0 | 1 | 0 |
| 5   | 0 | 1 | 1 | 0 |
| 6   | 1 | 1 | 1 | 0 |
| 7   | 0 | 0 | 0 | 1 |
| 8   | 1 | 0 | 0 | 1 |
| 9   | 0 | 1 | 0 | 1 |
| 10  | 1 | 1 | 0 | 1 |
| 11  | 0 | 0 | 1 | 1 |
| 12  | 1 | 0 | 1 | 1 |

It will be noted that the expander clock terminal 113 is connected by diode 230 to gate 202. The expander clock terminal 113 is similarly connected to each of the remainder of the gates 195–201. The other four gates 191–194 are connected by way of diodes to the expander terminal 233. Terminal 233 is connected to a switch 234 which serves to connect terminal 233 to terminal 113 in one position. In the other position, switch 234 connects terminal 233 to ground, shorting out or eliminating the first four counts from the counter. Switch 234 is also shown on FIG. 3 and provides for selecting operation on a 7-count or an 11-count as may be desired. For a 7-count cycle, the switch 234 would be connected to ground as shown. For an 11-count cycle, the switch would be connected to terminal 113. It will be recognized that a 7-count call sequence would be adequate for local dialing purposes whereas an 11-count sequence would be necessary for long-distance dialing.

The twelfth count applied to terminal 112, FIG. 5, shorts transistor 120 which deactivates the clock. Following the twelfth count, the timer, FIG. 5, terminates operation of the control unit 81.

The output signals from the counter 82 of FIGS. 3 and 6 are then applied by way of lines 211–221 to the call code cell 83 and to the ID code cell 91. The call code cell 83 is provided with eleven pairs of lateral lines, one pair connected to each of the output lines 211–221. For example, line 211 is connected to lines 211a and 211b by way of diodes 211c and 211d, respectively. Line 212 is connected to lines 212a and 212b. The remainder of the lines are similarly connected, the last line 221 being connected to lines 221a and 221b.

The call code cell 83 further includes seven longitudinal lines A1–A4, B1–B3 which lead to a gate unit 240. In a similar manner, the lines 211–221 are connected by way of pairs of diodes to pairs of lateral lines extending across the cell 91. Cell 91 has eight longitudinal lines A0–A4, B1–B3. The lateral and longitudinal lines on cells 83 and 91 may be selectively interconnected to form any desired sequences of pairs of tones. For example, on call cell 83 line 211 is connected to cause production of tones A1 and B1. Line 212 is connected to cause production of tones A1 and B2. By this means any seven digit number or eleven digit number may be coded in each of the cells 83 and 91. The longitudinal lines on cell 91 also lead to gate 240. Line 116 is connected by way of resistors 241 to seven buses on gate 240, each of which is connected to one of the lines A1–A4, B1–B3, from cell 83. The connections are at points between the resistors 241 and diodes 242. Thus, when a call sequence is to be carried out, a voltage is maintained on line 116, enabling the signals from the call cell to pass through the gate 240.

The line 115 is connected, as will be described, to energize the seven buses on gate 240 by way of resistors 243. The seven lines A1–A4 and B1–B3 from cell 91 are connected to the bus lines on gate 240 at points located between resistors 243 and diodes 244. Diodes 244 are poled opposite the diodes 242.

Line A0 of cell 91 is connected directly through the gate unit 240 to a relay driver circuit 245, the output of which is connected to the first coil in bank 67. The seven buses in the gate unit 240 are connected by way of a circuit identical to the driver circuit 245 to seven of the coils in bank 67, i.e. the coils for tone A1, A2, A3, A4, B1, B2, and B3.

All of the driver circuits have not been shown in detail since they are identical with circuit 245 which is a simple two transistor, direct coupled amplifier.

It will be noted that eight output lines from the card reader 70 are connected to the lines leading to eight of the top ten coils in bank 67, i.e. A1–A4 and B1–B4.

It will be further noted that lines leading from the external keyboard 93 are provided for connecting to all of the coils in bank 67.

The first coil in bank 67 is shunted by a diode 250 to suppress any voltage spikes that develop upon interruption of current flow through the first coil. A diode (not shown) is provided for each of the other coils in bank 67.

The relay drive circuit 245, when energized, essentially connects to ground the A0 line so that current may flow from the power supply line 251 through resistor 252 through the top coil in bank 67. It will be noted that resistor 252 is connected at its lower end, by way of channel 253, to a squelch terminal on amplifier 50 so that the amplifier 50 will have decreased gain when two or more of the coils in bank 67 is energized.

The common terminal to the bank of relays 64 is connected by way of line 260 to the common input terminal of oscillator A. Five lines 261 connect the top five relays to terminals A0–A4 on oscillator 61. Line 262 connects the common terminal of relays in bank 65 to the common input terminal of oscillator 62. Lines 263 connect the relays of bank 65 to terminals B0–B4 of oscillator 62.

The line 264 is connected to the common input terminal of oscillator 63. Lines 265 connect the relays in bank 66 to the input terminals C0–C3 of oscillator 63. The outputs of the oscillators 61, 62 and 63 are all summed on line 68.

It will be of particular significance to note that the call cell 83 and the ID code cell 91 are plug-in units being provided with plugs 270 and 271, respectively. In a preferred embodiment of the invention, the call code cell 83 and the ID code cell 91 will be tailored for a particular terminal location. The ID code cell is of character such that for a given destination, not only will the longitudinal lines A1–A4 and B1–B3 be selectively interconnected with the lateral line to give pairs of tones on each of the seven or eleven steps effective in the dialing sequence, but also there will be a unique tone involved in the combination by reason of connections made between the longitudinal lines A0 on cell 91 and selected ones of the lateral lines. By this means, a particular and unique code can be set in the ID code cell 91 so that a given computer account, for example, can be accessed only after proper identification through the use of the combinations of circuits energized through the lines A1–A4, B1–B3, along with A0. It will be noted that the external keyboard 93 has provision for energizing the A0 tone, but that the keyboard 28 does not have such capability nor does the card reader 70. Thus, by the arrangement above described, access is dependent upon satisfying unique code requirements. Such code requirements will be satisfied only by a selected sequence dictated by the connections on the ID code cell 91 or by manually introducing such a sequence through the external keyboard 93.

In practice, the ID code cell 91 as well as the call code 83 could be generally accessible to an operator and could be replaced through use of the plugs 271 and 270, respectively, by the operator. If desirable, access to such cells could be limited by suitable security lock or other security arrangements. For a permanent terminal installation, the ID code cell could be potted into the system, eliminating any possibility of change at any time. However, in the preferred aspect, the ID code cell is a plug-in type unit having at least one tone channel that is inaccessible through the keyboard associated with such terminal.

The system is supplied with power at terminal 251 from an AC source through line 300, power supply 301 and switch 302. A battery 303 may be employed through switch 304. An AC–DC selector switch 305 provides for such selection. Rectifying means 306 provide for charging battery 303.

In accordance with this invention, the decode unit 90 is connected to the line 60a leading from coil 60 to the audio amplifier.

Unit 60 is also connected to line 29a leading from the amplifier to speaker 29. An output line 37d leads from unit 90 to terminal 102 and to one input of a multivibrator 96. Multivibrator 91 is connected at one output through an AND gate 98 to a second multivibrator 97 and to an AND gate 96a, having a second input supplied by line 115 from control unit 81. The output of AND gate 96a is connected by way of line 96b to gate 240 to enable the ID cell 91 to transmit an ID code.

Decode unit 90 has a second output 37c leading to an AND gate 97a. The output of AND gate 97a is connected by way of line 97b to a bank 97c of AND gates so that keyboard 28 is enabled by the state on line 97b.

While not shown, line 97b may also extend to gate 70a in the lines from card reader 70 and/or to gate 93a in the lines leading from the external keyboard 93.

Once the state of the line 97b enables the gates 97c data may be generated by actuation of the keys on keyboard 28. When transmission is completed, a termination signal is produced on line 28a which leads to the second input of multivibrator 96.

It will be understood that the transmission of an ID code actuates decode unit 90 to apply a state on line 90e to AND gate 98 to trigger multivibrator 97. By this means, only after transmission of an ID signal and the receipt of an enable signal from coil 60 will the state on line 97b enable the system to transmit data through actuation of any one of the units 28, 70 or 93.

In one embodiment of the system, the following parameters and conditions were employed:

The clock (FIG. 5) had a period of about 100 milliseconds.

The timer and associated circuits included:

Capacitor 140—47 microfarads
Resistor 139—820K ohms
Capacitor 135—5 microfarads
Resistor 136—47,000 ohms
Transistors 128, 138, 141 and 142—2N3711
Transistors 123 and 133—2N3704
Transistor 124—2N3703
SCR 166 and 167—TIC44
Diode 130—IN753
Battery 119—12 volts In the counter:
Units 170, 171, 172 and 173 were integrated circuits MC853P manufactured and sold by Motorola.
Units 191–202 were integrated circuits MC844P by Motorola.
The relays 64–66 were reed relays of the type manufactured and sold by Elec-Trol, Inc., 21018 Soledad Rd., Saugus, Calif. 91350, Model No. R2155-2 or RA–30011121.

Figure 7:
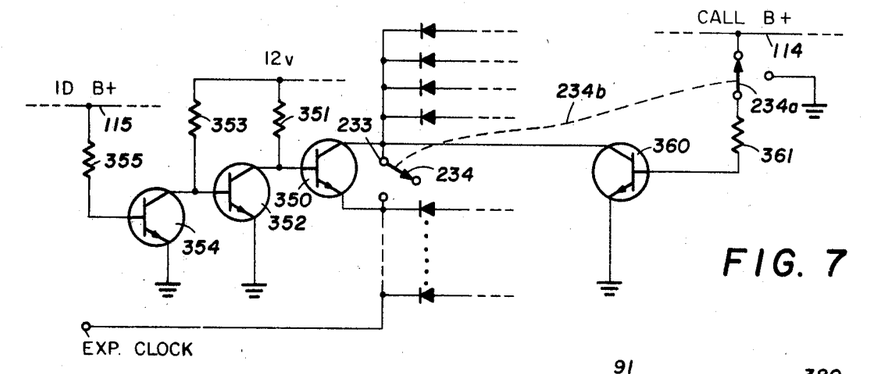
FIG. 7 illustrates one embodiment of the means for selection of a local or a long distance mode.

FIGURE 7

In the foregoing description in connection with the operation of the switch 234 the counter would be caused to operate either at 8 or 12 counts depending upon whether local or long distance dialing is desired. In a preferred embodiment of the invention it is desirable to operate the identification sequence from code cell 91 without change, when switching from local to long distance dialing. More particularly in FIG. 6, with the switch 234 in the position indicated, the top four stages of the counter 191–194 are grounded and inoperative so that only the last eight stages 195–202 operate. In such cases, both the dial sequence and the identification sequence of tones would be limited to seven tones.

In FIG. 7 a modification has been shown which represents a preferred mode of operation. It assures that, for local dialing, the identification sequence is the same as on the long distance dialing, more particularly, a dialing sequence of seven tones will be followed by an eleven tone identification sequence. This is accomplished in FIG. 7 where switch 234 has been shown in the same position as in FIG. 6. However, the terminal which the switch contacts is open. The circuit includes a transistor 350 having its collector-emitter terminals connected in parallel with switch 234. The base is connected by way of resistor 351 to the 12 volt supply and to the collector of a second transistor 352 whose emitter is grounded and whose base is connected by way of resistor 353 to the 12 volt supply. The base of transistor 352 is connected to the collector of transistor 354 whose emitter is grounded and whose base is connected by way of resistor 355 to line 115. Line 115 corresponds with line 115 of FIG. 3 and is the B+ bus for the ID portion of gate 240.

A transistor 360 is connected at its collector to the collector of transistor 350. The emitter of transistor 360 is grounded and its base is connected by way of resistor 361 and switch 234a to line 114. Line 114 is the B+ bus for the call code portion of gate 240, FIG. 3. Switches 234 and 234a are mechanically coupled as indicated by dotted line 234b. The second terminal of switch 234a is connected to ground.

In operation when the ID unit 90, FIG. 3, is actuated the voltage on line 115, FIG. 7, causes transistor 350 to conduct, effectively shorting switch 234. Thus, when in the local position, it does not matter that switch 234 leads to an open circuit. The ID sequence will always be 11 tones. The actuation of the call button 80 will cause transistor 360 to conduct thus shorting switch 234 so that in the call mode only seven tones will be generated. This is because transistor 360 effectively grounds or disables the top four channels of the counter. Thus by this means, in the local mode, only seven tones will be generated for the call sequence while maintaining eleven tones for the ID sequence. In the long distance mode, eleven tones will be generated on both the call and ID sequence.

FIGURES 8–11

In FIGS. 8–11, a suitable construction for the ID code cell 91 is shown. The cell is based upon the provision of a matrix of conductors on a card 380. A plug 271 extends along the upper edge 381 of the card and has two rows of female contacts, an input set 271a and an output set 271b. On the face shown in FIG. 8 there are 22 transverse conductors 382. The conductors 382 are each connected by way of a diode such as diode 383 to one of the contacts in a set of contacts 384, which in turn are connected to the plug terminals 271b. Only one diode, the diode 383, has been shown in FIG. 9, it being understood that 21 like diodes will be mounted on the card 380 to complete the connections indicated in FIG. 3.

Figures 8, 9, 10, 11:
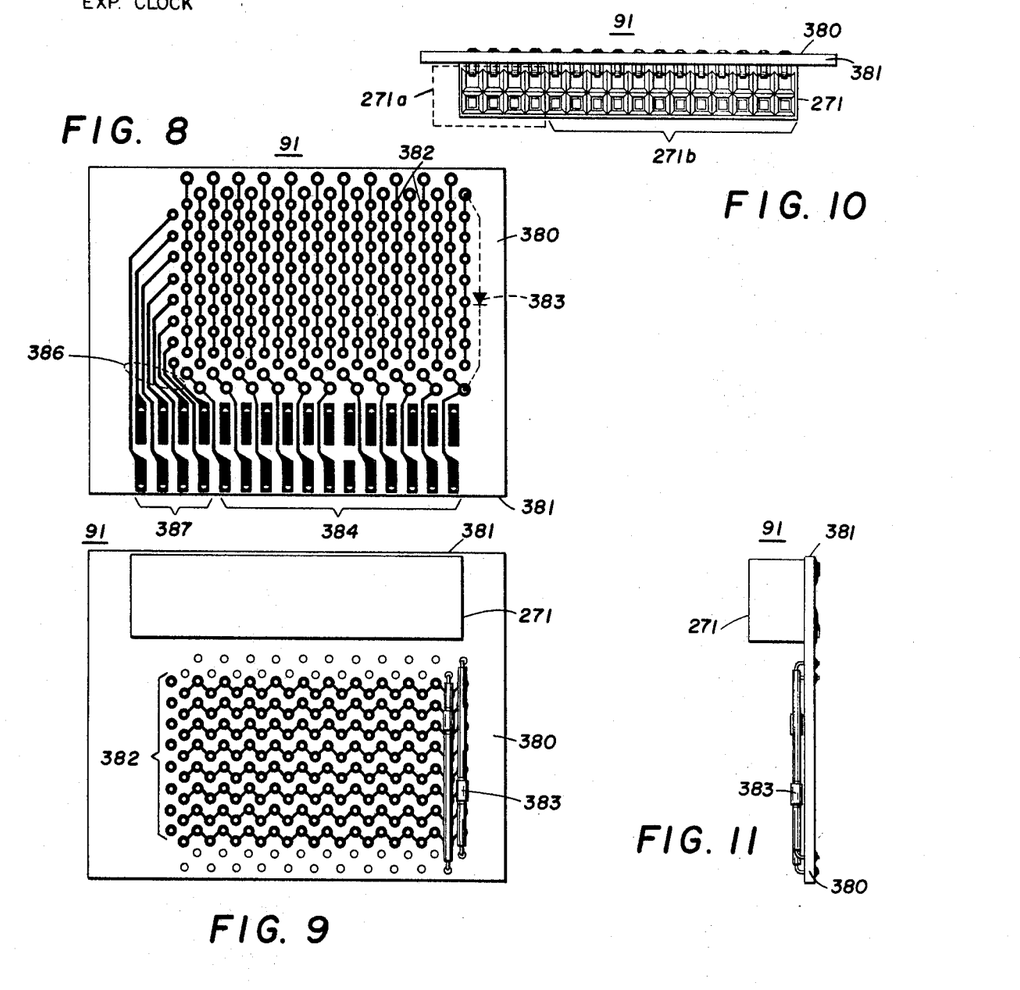
FIGS. 8–11 illustrate the identification and call cell construction.

Eight (8) longitudinal lines 382 are connected by way of strips 386 to the set of output terminals 387 which in turn are connected to the plug terminals 271a. The eight (8) longitudinal lines 382 are located on the opposite face of card 380 as shown in FIG. 9.

The intersection of each of the lateral lines 283 and longitudinal lines 383 is a hole which extends through the card 380. Any card may thus be conveniently coded by the insertion of a conductive member through the hole and electrically bonding the same to the strips on the opposing sides of the card 380 common to the selected hole. Diodes such as diode 383 are mounted on the face card 380, viewed in FIG. 9, and shown in the side view of FIG. 11.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a data communication system where data signals are to be transmitted to a remote station via a communication channel, the combination which comprises:
    (a) a data terminal including means for coupling to said channel,
    (b) identification means at said data terminal connected to said means for coupling and responsive to a call signal upon said channel for transmitting to said channel a coded signal uniquely identifying said terminal,
    (c) transmission enable means connecting said terminal to said means for coupling, and
    (d) means responsive to transmission of said identifying signal to arm said enable means for response to an enable signal on said channel whereby said terminal may transmit data signals to said channel.

2. The combination set forth in claim 1 wherein said identification means includes a plurality of tone generators and means to energize said generators in a predetermined sequence.

3. The combination set forth in claim 1 wherein said enable means includes switch means latched normally to prevent transmission of data from said terminal to said channel and trigger means to unlatch said switch means in response to said enable signal.

4. In a data communication system where data signals are to be transmitted via a communication channel extending to a remote station, the combination which comprises:
    (a) a data terminal having a selectively actuated encoder normally locked in a disabled state,
    (b) identification means at said data terminal coupled to said channel and responsive to a call signal thereon for transmitting to said channel a coded signal uniquely identifying said terminal,
    (c) transmission enable means connecting said encoder to said channel,
    (d) arming means responsive to transmission of said identifying signal to arm said enable means, and
    (e) means responsive to an enable signal on said channel to unlock said encoder for transmission of coded data signals over said channel between said terminal and said remote station.

5. The combination set forth in claim 4 wherein said arming means includes a gate which has one control state set by transmission of said coded signal from said identification means and a second control state set by an enable signal transmitted to said data terminal over said channel.

6. The combination set forth in claim 5 wherein said arming means is connected to normally closed gates which normally prevent transmission of data from said terminal to said channel.

7. The method of controlling the transmission of data where data signals are to be transmitted between a remote terminal and a central processor via a communication channel, the steps of:
    (a) normally establishing a control condition in said terminal to disable the same from responding to data or transmitting data therefrom,
    (b) generating a call signal on said channel uniquely to designate said terminal,
    (c) in response to said call signal transmitting from said terminal to said channel and said central processor a coded signal uniquely identifying said terminal, and
    (d) in response to transmission of said coded signal arming said terminal for response to an enable signal on said channel whereby said terminal is enabled for transmission of data signals over said channel between said terminal and said central processor.

8. The method set forth in claim 7 wherein said call signal and said coded signal each comprise a plurality of audio tones in predetermined sequences.

9. The method set forth in claim 7 wherein a normally latched condition in said terminal prevents transmission of data from said terminal to said channel except in response to said enable signal.

10. In a data communication system where data signals are to be transmitted via a telephone communication channel extending to a remote station, the combination which comprises:
    (a) a data terminal including means for coupling to said channel,
    (b) identification means at said data terminal connected to said means for coupling and responsive to a call signal upon said channel for transmitting to said channel a coded tone signal uniquely identifying said terminal,
    (c) transmission enable means connecting said terminal to said means for coupling, and
    (d) means responsive to transmission of said identifying signal to arm said enable means for response to an enable signal from the remote station on said channel whereby data signals may be transmitted over said channel between said terminal and said remote station.

11. In a data communication system where data signals are to be transmitted via a telephone communication channel to a remote station, the combination which comprises:
    (a) a data terminal having a selectively actuated encoder normally locked in a disabled state,
    (b) identification means at said data terminal coupled to said channel and responsive to a call signal thereon for transmitting to said channel a coded tone signal uniquely identifying said terminal, (c) transmission enable means connecting said encoder to said channel,
(d) arming means responsive to transmission of said identifying signal to arm said enable means, and
(e) means responsive to an enable signal on said channel to unlock said encoder for transmission of coded data signal to said channel.

12. The method of controlling the transmission of data where data signals are to be transmitted from an input terminal to a central processor via a telephone communication channel, the steps of:
(a) normally establishing a control condition in said terminal to disable the same from transmitting data therefrom,
(b) generating a call signal on said channel uniquely to designate said terminal,
(c) in response to said call signal transmitting from said terminal to said channel a coded tone signal uniquely identifying said terminal, and
(d) in response to transmission of said coded signal arming said terminal for response to an enable signal on said channel applied from the central processor whereby said terminal may transmit data signals to said channel.

References Cited

UNITED STATES PATENTS

| | | |
|---|---|---|
| 2,193,875 | 3/1940 | Lindenblad. |
| 2,815,400 | 12/1957 | Poylo. |
| 2,957,952 | 10/1960 | Jaeger. |
| 3,131,259 | 4/1964 | Di Iorio et al. |
| 3,187,107 | 6/1965 | Knight et al. |
| 3,225,334 | 12/1965 | Fields et al. |
| 3,229,036 | 1/1966 | Hillyer. |
| 3,240,427 | 3/1966 | Holman. |
| 3,242,480 | 3/1966 | Walker. |
| 3,277,243 | 10/1966 | Fairbain. |
| 3,301,967 | 1/1967 | Plyer. |
| 3,407,387 | 10/1968 | Looschen et al. |
| 3,413,423 | 11/1968 | Steuko. |
| 3,415,947 | 12/1968 | Abbey et al. |
| 3,288,932 | 11/1966 | Cleary et al. 179—2 XR |
| 3,327,060 | 6/1967 | Hogan 179—89 |
| 3,336,445 | 8/1967 | Nakagawa 179—5 |
| 3,305,635 | 2/1967 | Kadis. |
| 3,315,039 | 4/1967 | Gebhardt et al. |
| 3,347,988 | 10/1967 | Marill et al. |
| 3,371,162 | 2/1968 | Scantlin. |
| 3,375,500 | 3/1968 | Fowler et al. |
| 3,381,276 | 4/1968 | James. |
| 3,384,713 | 5/1968 | Duncan. |
| 3,395,245 | 7/1968 | Harris. |
| 3,399,385 | 8/1968 | Gorman et al. |
| 3,400,378 | 9/1968 | Smith et al. |
| 3,403,225 | 9/1968 | Mislan et al. |

DONALD J. YUSKO, Primary Examiner

U.S. Cl. X.R.

179—2